United States Patent
Scavezze et al.

(10) Patent No.: US 10,613,642 B2
(45) Date of Patent: Apr. 7, 2020

(54) GESTURE PARAMETER TUNING

(71) Applicant: Microsoft Technology Licensing, LLC, Redmond, WA (US)

(72) Inventors: Michael Scavezze, Bellevue, WA (US); Adam G. Poulos, Sammamish, WA (US); John Bevis, Seattle, WA (US); Jeremy Lee, Redmond, WA (US); Daniel Joseph McCulloch, Kirkland, WA (US); Nicholas Gervase Fajt, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 813 days.

(21) Appl. No.: 14/207,242

(22) Filed: Mar. 12, 2014

(65) Prior Publication Data
US 2015/0261318 A1 Sep. 17, 2015

(51) Int. Cl.
*G06F 3/0481* (2013.01)
*G06K 9/00* (2006.01)
(Continued)

(52) U.S. Cl.
CPC ............ *G06F 3/0346* (2013.01); *G06F 3/012* (2013.01); *G06F 3/017* (2013.01)

(58) Field of Classification Search
CPC .... G06F 3/04883; G06F 3/017; G06F 3/0481; G06F 3/0482; G06F 3/0483; G06F 3/0488; G06K 9/00; G06T 7/00; G06T 7/20
See application file for complete search history.

(56) References Cited

U.S. PATENT DOCUMENTS 4,679,789 A * 7/1987 Okada .................... A63F 13/10
463/23
6,466,232 B1   10/2002 Newell et al.
(Continued)

FOREIGN PATENT DOCUMENTS

| CN | 102301315 A | 12/2011 |
| CN | 102540464 A | 7/2012 |
| WO | 2013121730 A1 | 8/2013 |

OTHER PUBLICATIONS

IPEA European Patent Office, International Preliminary Report on Patentability Issued in Application No. PCT/US2015/019345, dated Dec. 17, 2015, WIPO, 7 Pages.
(Continued)

*Primary Examiner* — Arpan P. Savla
*Assistant Examiner* — Erik V Stitt
(74) *Attorney, Agent, or Firm* — Alleman Hall Creasman & Tuttle LLP

(57) ABSTRACT

Embodiments are disclosed herein that relate to tuning gesture recognition characteristics for a device configured to receive gesture-based user inputs. For example, one disclosed embodiment provides a head-mounted display device including a plurality of sensors, a display configured to present a user interface, a logic machine, and a storage machine that holds instructions executable by the logic machine to detect a gesture based upon information received from a first sensor of the plurality of sensors, perform an action in response to detecting the gesture, and determine whether the gesture matches an intended gesture input. The instructions are further executable to update a gesture parameter that defines the intended gesture input if it is determined that the gesture detected does not match the intended gesture input.

20 Claims, 6 Drawing Sheets

(51) Int. Cl.
*G06T 7/00* (2017.01)
*G06F 3/01* (2006.01)
*G06T 7/20* (2017.01)
*G06F 3/0346* (2013.01)

(56) References Cited

U.S. PATENT DOCUMENTS

| | | | | |
|---|---|---|---|---|
| 6,730,047 B2* | 5/2004 | Socci | ................... | A61B 5/1114 |
| | | | | 600/595 |
| 7,996,793 B2 | 8/2011 | Latta et al. | | |
| 8,296,151 B2 | 10/2012 | Klein et al. | | |
| 8,418,085 B2* | 4/2013 | Snook | ................... | G06F 3/017 |
| | | | | 715/707 |
| 8,436,821 B1* | 5/2013 | Plichta | ................ | G06F 3/04883 |
| | | | | 345/156 |
| 8,756,501 B1* | 6/2014 | Karam | ................... | H04L 51/32 |
| | | | | 715/700 |
| 9,007,301 B1* | 4/2015 | Raffle | ................... | G09G 3/003 |
| | | | | 345/156 |
| 9,007,401 B1* | 4/2015 | Cho | ................... | G02B 27/017 |
| | | | | 345/633 |
| 9,239,626 B1* | 1/2016 | Wu | ................... | G06F 3/017 |
| 2002/0183657 A1* | 12/2002 | Socci | ................... | A61B 5/1114 |
| | | | | 600/595 |
| 2010/0188328 A1 | 7/2010 | Dodge et al. | | |
| 2010/0306716 A1* | 12/2010 | Perez | ................... | A63F 13/213 |
| | | | | 715/863 |
| 2011/0001699 A1 | 1/2011 | Jacobsen et al. | | |
| 2011/0043443 A1 | 2/2011 | Kawano et al. | | |
| 2011/0093820 A1 | 4/2011 | Zhang et al. | | |
| 2011/0169726 A1 | 7/2011 | Holmdahl et al. | | |
| 2011/0314427 A1* | 12/2011 | Sundararajan | .......... | G06F 9/451 |
| | | | | 715/863 |
| 2012/0127284 A1* | 5/2012 | Bar-Zeev | ............. | G02B 27/017 |
| | | | | 348/53 |
| 2012/0131513 A1 | 5/2012 | Ansell | | |
| 2012/0167017 A1 | 6/2012 | Oh | | |
| 2012/0183657 A1* | 7/2012 | Marina | ................. | A47J 31/407 |
| | | | | 426/394 |
| 2013/0050258 A1* | 2/2013 | Liu | ..................... | G06F 17/3087 |
| | | | | 345/633 |
| 2013/0095924 A1* | 4/2013 | Geisner | ................... | G06F 3/012 |
| | | | | 463/32 |
| 2014/0009378 A1* | 1/2014 | Chew | ..................... | G06F 3/017 |
| | | | | 345/156 |
| 2014/0062854 A1* | 3/2014 | Cho | ........................ | G06F 3/017 |
| | | | | 345/156 |
| 2014/0108993 A1* | 4/2014 | Zhai | ..................... | G06F 3/0489 |
| | | | | 715/773 |
| 2014/0225918 A1* | 8/2014 | Mittal | ..................... | G06F 3/017 |
| | | | | 345/633 |
| 2015/0049112 A1* | 2/2015 | Liu | ..................... | G06T 19/006 |
| | | | | 345/633 |
| 2015/0192991 A1* | 7/2015 | Dal Mutto | ............ | G06F 3/0482 |
| | | | | 715/747 |
| 2015/0205479 A1* | 7/2015 | Zhu | ..................... | G06F 3/0488 |
| | | | | 715/863 |

OTHER PUBLICATIONS

IPEA European Patent Office, Second Written Opinion Issued in Application No. PCT/US2015/019345, dated Sep. 25, 2015, WIPO, 6 pages.
ISA European Patent Office, International Search Report and Written Opinion issued in Application No. PCT/US2015/019345, dated May 19, 2015, Netherlands, 10 Pages.
"iOS: Using AssistiveTouch", Apple, http://support.apple.com/kb/HT5587, Last modified Dec. 19, 2012, 2 pages.
"First Office Action and Search Report Issued in Chinese Patent Application No. 201580013497.3", dated May 31, 2018, 13 Pages.
"Office Action Issued in European Patent Application No. 15711970.2", dated Feb. 10, 2020, 06 Pages.

* cited by examiner ical gesture may be
defined by one or more parameters specifying value ranges
for characteristics related to user motion, such as direction,
speed, acceleration, etc. The use of a larger range of acceptable values for a gesture may help users to more easily perform the gesture successfully. However, the use of a larger range also may limit the number of different gestures able to be interpreted by the system, and may increase a risk of false positive gesture identifications (e.g., the identification of gesture inputs that were not intended to be gesture inputs by a user). Conversely, the use of a smaller range may increase a likelihood of false negatives (e.g., the failure to identify intended gesture inputs). As different users may perform a selected gesture in somewhat different manners, it may be difficult to determine parameter ranges suitable for a large number of users.

GESTURE PARAMETER TUNING

BACKGROUND

Three-dimensional human body gestures used for computing device inputs may be defined by specific motions of a specific body part or parts in one or more dimensions over time. Such motions may be recognized as a gesture, for example, if the motion falls within allowable ranges of locations, velocities, acceleration, and/or other quantities defined for that gesture.

SUMMARY

Embodiments are disclosed herein that relate to tuning gesture recognition characteristics for a device configured to receive gesture-based user inputs. For example, one disclosed embodiment provides a head-mounted display device comprising a plurality of sensors, a display configured to present a user interface, a logic machine, and a storage machine that holds instructions executable by the logic machine to detect a gesture based upon information received from a first sensor of the plurality of sensors, perform an action in response to detecting the gesture, and determine whether the gesture matches an intended gesture input. The instructions are further executable to update a gesture parameter that defines the intended gesture input if it is determined that the gesture detected does not match the intended gesture input.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

As described above, a three-dimensional gesture may be defined by one or more parameters specifying value ranges for characteristics related to user motion, such as direction, speed, acceleration, etc. The use of a larger range of acceptable values for a gesture may help users to more easily perform the gesture successfully. However, the use of a Thus, embodiments described herein provide for the dynamic tuning, or adjustment, of parameters that define gesture inputs for a computing device. Using the described embodiments, parameters that define a gesture may be tuned for a particular user as the user performs the gestures. In some embodiments, the gesture recognition system tuning may occur as a background process during ordinary device use, while in other embodiments gesture recognition tuning may be performed via a dedicated program presented, for example, as an entertainment activity.

Figure 1:
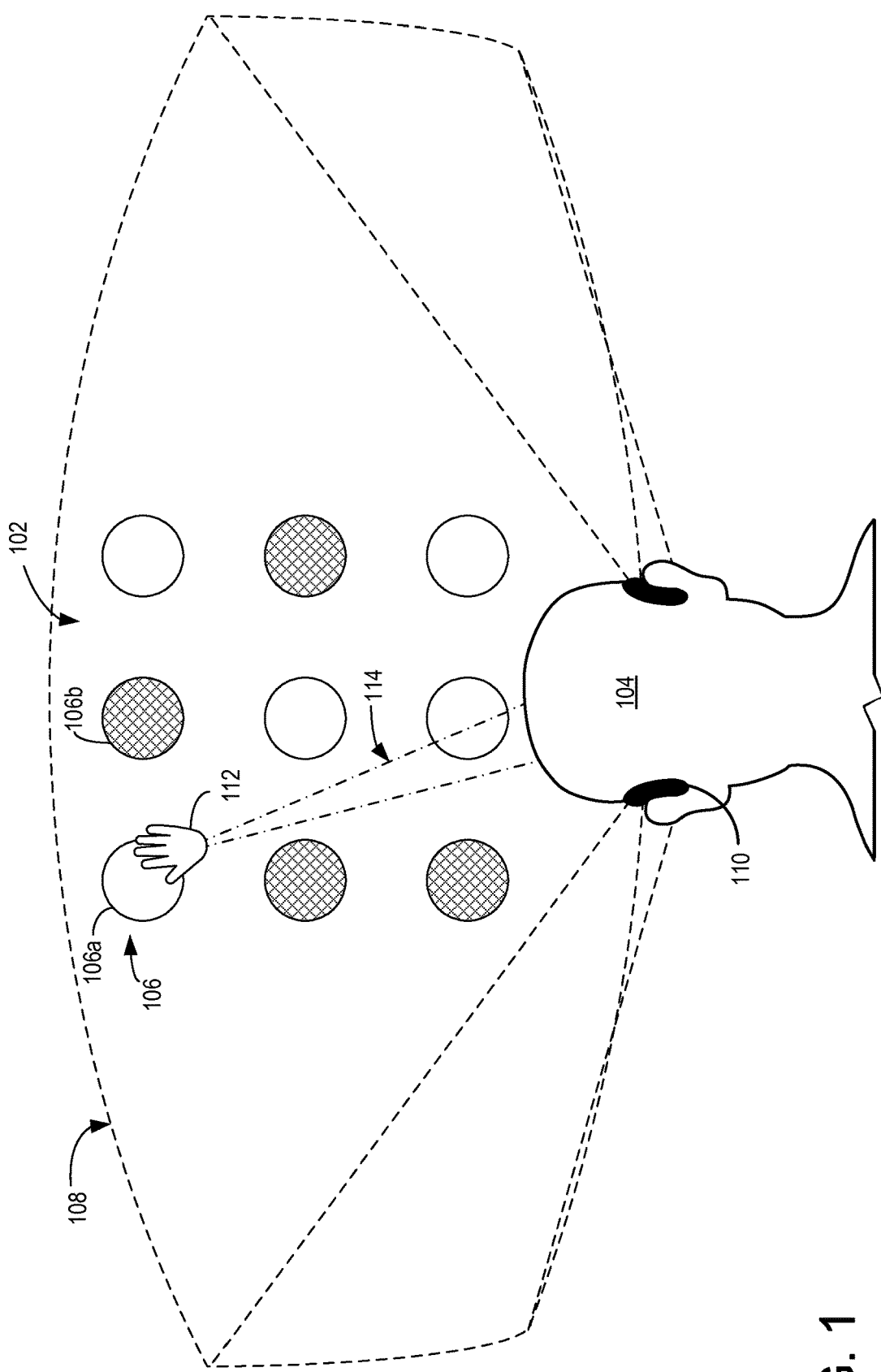
FIG. 1 shows an example user interface for tuning gesture parameters in accordance with an embodiment of the present disclosure.

FIG. 1 shows an example user interface 102 for an interactive game activity displayed on a head-mounted display device 110, wherein a user 104 may interact with the user interface via gestures detected using one or more sensors on the head-mounted display device 110. For example, the detected gestures may include head gestures, hand gestures, eye gestures, and/or body gestures detected by one or more motion sensors, and/or voice inputs detected by one or more microphones on the head-mounted display device and/or communicatively connected to the head-mounted display device. The use of a game for gesture recognition system tuning may help to reduce any ambiguity in determining whether a detected motion was intended to be a gesture, as the user intent to perform a gesture input may be inferred from the user's participation in the game. Where tuning is performed as a background process during ordinary device use, such an intent may be determined, for example, from other sensor data that provides information regarding user intent, as described in more detail below. It will be understood that the dashed lines in FIG. 1 may represent a field of view 108 of the see-through head-mounted display device in which virtual imagery can be displayed, and that the depicted game may be displayed via a see-through display screen of the see-through display device.

User interface 102 includes one or more interactive game elements 106 each having a changeable visual state, such as a changeable color. For example, interactive game element 106a is shown in a first color (represented by a solid white fill in FIG. 1) and interactive game element 106b is shown in a second color (represented by a hatched pattern fill in FIG. 1). In the game, a user may change a visual state of an interactive element from an initial visual state to a target visual state via a gesture, such as a head gesture detected via a motion sensor (e.g. accelerometer, gyroscope, image sensor, etc.) on the head-mounted display device 110. A goal of the game may be, for example, to change each interactive game element to a target visual state using a specified gesture input to interact with each interactive game element. In some embodiments, different gestures may be used to interact with different elements, thereby allowing the tuning of parameters for multiple different gestures to be performed in a same instance of the game. It will be understood that a user may be instructed how to perform the gesture at an onset of the game.

The user interface 102 may include a cursor 112 controllable, for example, via a gaze detection system of the head-mounted display device 110. The gaze detection system may provide an indication of a direction of a gaze 114 of the user 104, and/or a location at which the user's determined gaze intersects the user interface 102. The user's gaze may be tracked in any suitable manner. For example, in some embodiments, an eye tracking system utilizing an eye-imaging camera and light sources configured to reflect light from a user's cornea may be used to detect a direction in which the user's eye is directed. A gaze line may then be projected, and an intersection of the gaze line with the user interface 102 may be used to map the gaze to the user interface 102. In other embodiments, any other suitable method may be used to control the cursor, such as head movements (e.g., as detected by a camera, gyroscope, accelerometer, and/or other sensor(s) of the head-mounted display device 110), body gestures (e.g. movement of the user's hand as detected via an outward facing image sensor on the head-mounted display device 110), etc.

As mentioned above, the user 104 may change the visual state of each interactive game element 106*a* by performing a specified gesture input for that interactive game element, such as a sudden lift of the user's head. Each gesture used to interact with the interactive game elements may be defined by gesture parameters, such as an angle/trajectory of movement, a speed of movement, an acceleration profile, a stabilization period (e.g., a time to tolerate excess jitter before/after performing the gesture), a starting and/or ending position of the movement, and/or any other suitable characteristics. Further, each parameter may include a range of acceptable values.

When the user 104 targets the interactive game element 106*a* (e.g., based on head position, gaze direction, etc.) and motion that meets the definition of the specific gesture based upon the current gesture parameters is detected, the visual state of interactive game element 106*a* may be changed from the initial visual state to the targeted visual state.

However, if a motion that falls within the definition of the specified gesture is determined to be directed at an interactive game element that already has the targeted visual state, the gesture determination may be considered to be a false positive. In response to the false positive, the parameters associated with the specified gesture may be modified to decrease a likelihood that the detected motion will be recognized as the specified gesture in the future. For example, one or more spatial gesture parameters may be changed such that the path of the motion would fall outside of the parameter range or ranges. Further, the updates to the gesture parameter(s) may be associated with a user profile in some embodiments, such that gesture parameters may be defined and utilized on a per-user basis. In this manner, a gesture recognition system may adapt to and remember individual user behaviors.

False positive gestures may be detected in other manners as well. For example, upon receiving feedback of a false positive gesture detection (e.g. an unintended user interface action), a user may perform an undo command using another input mechanism, such as a voice command, a hand gesture, or other suitable input. Likewise, contextual information received from other sensors also may be used to detect a false positive. For example, a user may speak words expressing frustration, shake fists, stomp feet, and/or perform other such actions, and these actions may be detectable from sensor data. Thus, upon detecting these actions after performing an action in response to a detected gesture input, the detection motion that was recognized as the gesture may again be analyzed to determine a likelihood of the recognition being a false positive. One or more of these methods of detecting false positives may be determined during ordinary device use, and thus may allow tuning to be performed as a background process during ordinary device use. It will be understood that these methods of detecting false positives are presented for the purpose of example, and are not intended to be limiting in any manner.

In other instances, a user may intend to perform the specified gesture, but the system may fail to recognize the gesture. This may be considered a false negative gesture recognition. A false negative may be detected, for example, where a user repeats a motion while visually targeting a same interactive element in the game. In some instances, gestures may be recognized in segments. Thus, if the system detects an initial segment of a gesture to be performed multiple times without the gesture being completed, the system may determine the occurrence of a false negative gesture recognition. As a more specific example, the selection gesture may comprise an upward nod (e.g., a lifting of the head), and the detected motion of the user 104 may be outside of the speed tolerance of the selection gesture and/or tilted too far to one side relative to the gesture parameters. In response to detecting the false negative gesture recognition, the parameters of the specified gesture may be updated such that the detected motion is more likely to be identified as the specified gesture.

Figure 2:
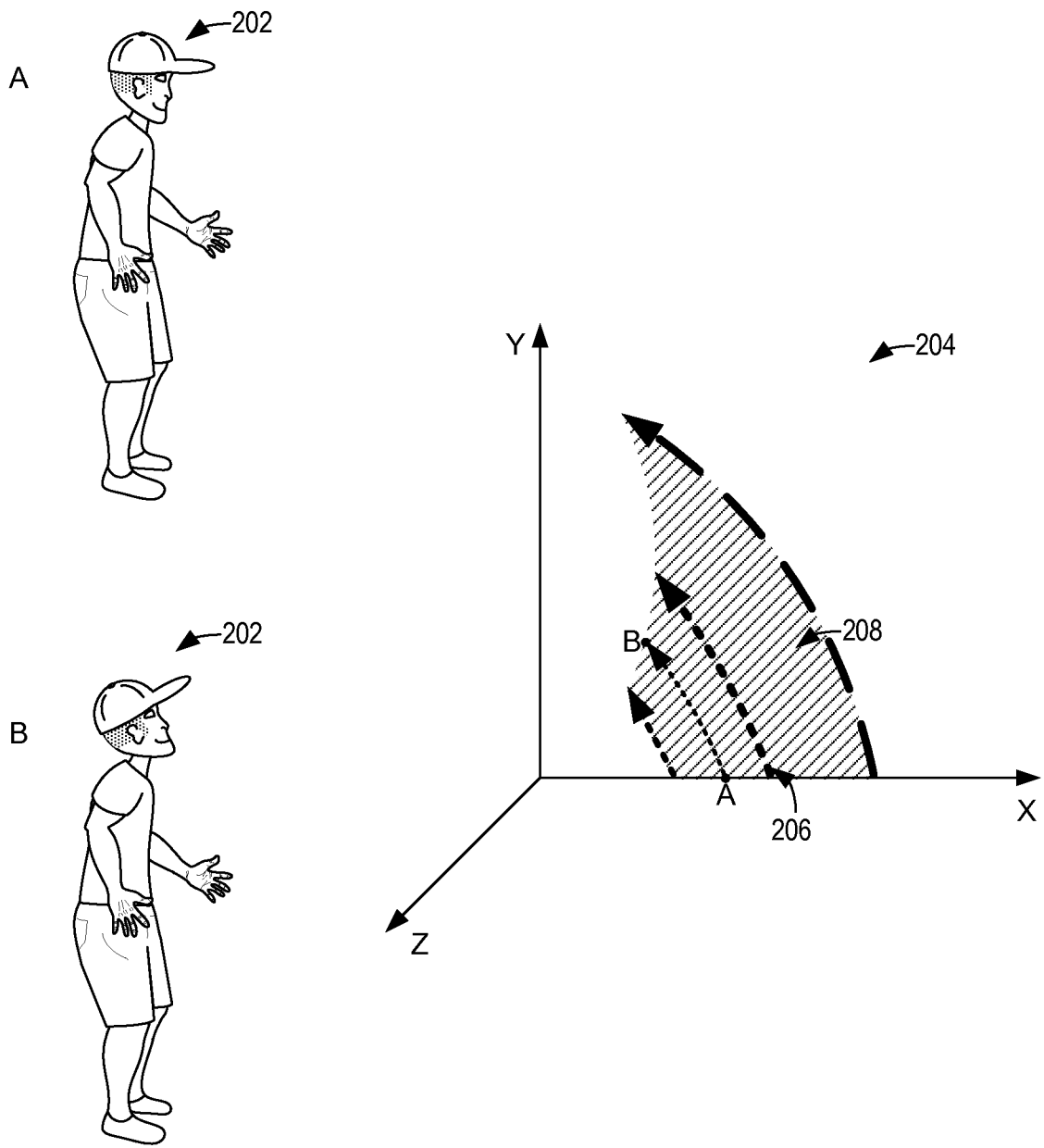
FIG. 2 shows an example head gesture in accordance with an embodiment of the present disclosure.

FIG. 2 illustrates an example head gesture (e.g., an upward nod), and also illustrates trajectories associated with the head gesture. Positions A and B represent a pose (e.g., position and orientation) of a head of a user 202 at different points in time during performance of a head gesture. As illustrated, the user's head at position B is lifted to an angle that is approximately 30 degrees offset from the user's head at position A. A representation of this offset is plotted on a graph 204 as a trajectory that extends from point A to point B on the graph 204. The graph 204 also illustrates a base trajectory 206 of the gesture, which represents an expected trajectory of the gesture. Tolerance zone 208 comprises a region of acceptable trajectories that may be different from the base trajectory 206 but still interpreted as the head gesture defined by base trajectory 206. The tolerance zone 208 is defined by the gesture parameters for the gesture. It is to be understood that only a tolerance zone may be defined for a gesture in some embodiments, rather than a base trajectory surrounded by a tolerance zone. As the trajectory followed by the head of the user 202 from position A to position B is within the tolerance zone 208, the motion performed by the user 202 in FIG. 2 may be recognized as the head gesture associated with the base trajectory 206.

Figure 3:
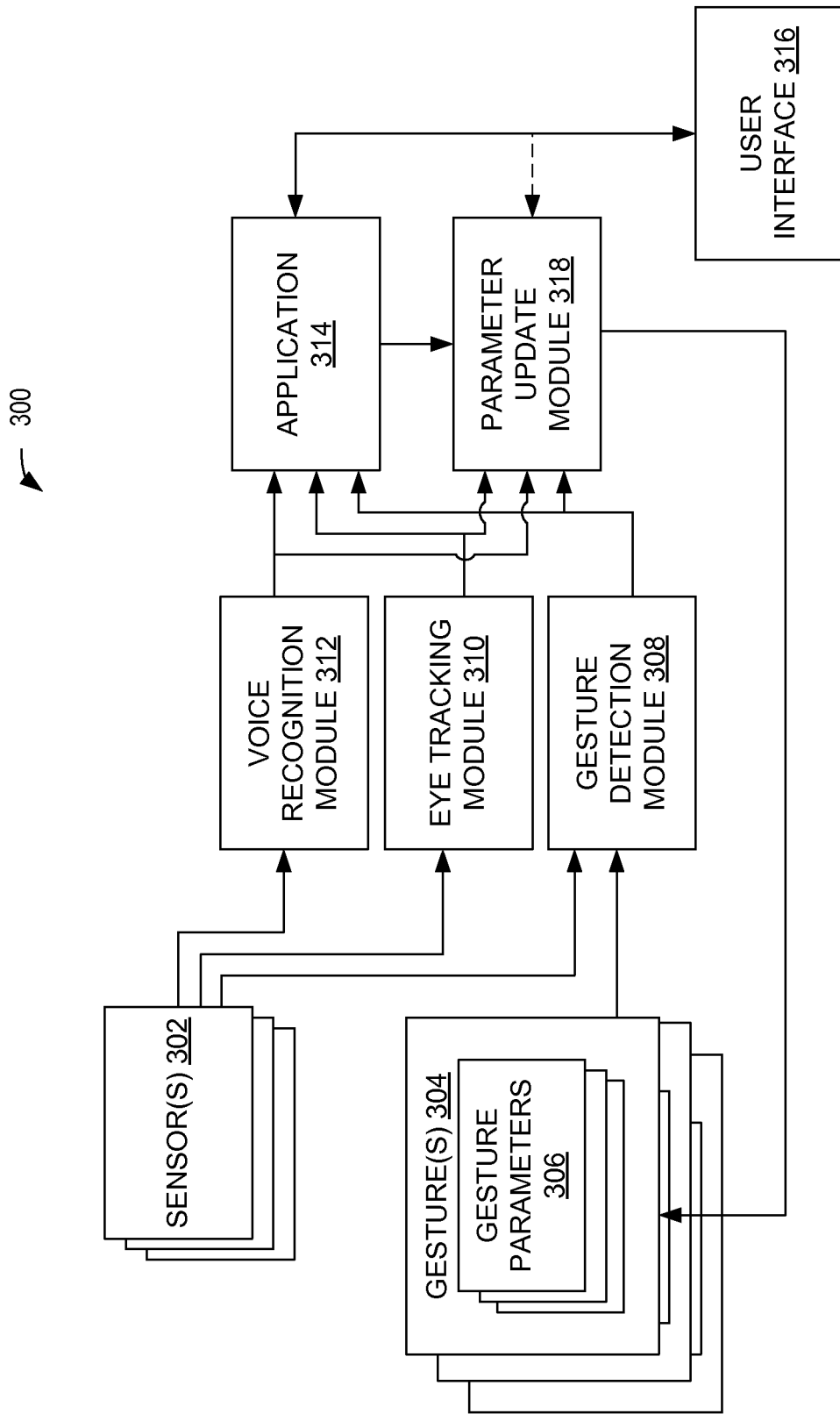
FIG. 3 is a block diagram of a gesture recognition system in accordance with an embodiment of the present disclosure.

FIG. 3 is a block diagram of an example gesture recognition system 300. Gesture recognition system 300 may, for example be incorporated in a head-mounted display device, such as the head-mounted display device 110 of FIG. 1. Gesture recognition system 300 may be implemented via instructions stored on a storage device of the head-mounted display device 110 and executed by a logic device on the head-mounted display device 110, or in any other suitable manner.

Gesture recognition system 300 may include one or more modules configured to receive and interpret data received from a plurality of sensors 302 (e.g., sensors on the head-mounted display device) and also may include gesture definitions 304 each comprising one or more parameters 306 that define an associated user input gesture). For example, modules such as a gesture detection module 308, eye tracking module 310, and voice recognition module 312 may receive information from one or more of the sensors 302 to monitor and/or track user input. The gesture parameters 306 may be stored on the head-mounted display device and accessed during gesture recognition. The sensors 302 may include motion sensors (e.g. one or more gyroscopes and/or accelerometers), an outward facing camera, and/or any other suitable sensors for sensing user movement. The sensors 302 may further include a depth camera, one or more eye-tracking sensors (e.g., one or more inward facing cameras), a microphone, and/or any other suitable sensors for detecting contextual information that may be used for assisting with gesture recognition and/or determining a user intent (e.g., via gaze detection, hand tracking, voice command detection, etc.) to make a gesture input. It is to be understood that the modules illustrated in FIG. 3 are presented for the purpose of example, and that other embodiments may utilize different modules to monitor and/or interpret user input and/or contextual information.

The gesture detection module 308 may comprise instructions executable by a logic device on the head-mounted display device (or on a computing system in communication with the head-mounted display device) to match motion information from sensors 302 to gesture parameters 306 to detect the performance of gestures. Upon detecting a gesture, the gesture detection module 302 may report the detected gesture to an application 314 that is presenting a user interface 316 for performing a user interface action associated with the detected gesture.

The gesture detection module 308 also may report the detected gesture, as well as sensor information associated with the detection of the gesture (e.g. motion path data), to the parameter update module 318. The parameter update module 318 may determine an intent of a user based upon information from the gesture detection module 308 (e.g., as monitored during and/or after the gesture is detected) and optionally from the user interface 316. The parameter update module 318 also may receive information from other sensor data analysis modules (e.g. voice recognition module 312, eye tracking module 310, etc.) corresponding to such user actions, and may determine the occurrence of a false positive gesture recognition from such data. For example, after a false positive gesture detection, a user may perform a head gesture, hand gesture, speech input, and/or other user input to undo or revert an action associated with the detected but unintended gesture. Upon detection of a false positive, the parameter update module 318 may update the parameters 306 for the gesture to help reduce the likelihood that the motion or motions performed by the user will be detected as gesture inputs in the future.

Likewise, in the event of a false negative condition, the user may become frustrated and perform exaggerated versions of the same motion in quick succession, or perform other actions characteristic of frustration (e.g., raising a level and/or frequency of voice input, uttering particular words associated with a frustrated state, moving hands rapidly/erratically, stomping feet, etc.). A false negative condition may also be indicated by the detection of multiple gesture initializations by the gesture detection module 308 and/or other input detection modules without corresponding gesture completions. As mentioned above, a gesture may be divided into a plurality of phases that are separately recognized and reported by the gesture detection module. For example, a gesture may be divided into an initialization (e.g., a first portion of the gesture and/or movements associated with the first portion of the gesture) and a completion (e.g., a remaining portion of the gesture). Thus, upon detecting a number of consecutive gesture initializations without corresponding completions that exceeds a threshold, the parameter update module 318 may recognize that a user intends to perform the gesture but is not performing the completion of the gesture correctly. Accordingly, the parameter update module 318 may update the parameters for the gesture 304 to increase the likelihood that the motion or motions performed by the user will be detected as gesture inputs in the future.

In some embodiments, the user interface 316 may present assistance to the user in response to multiple false positives and/or false negatives. For example, the user interface 316 may audibly and/or visually present instructions regarding performance of one or more gestures.

Figure 4:
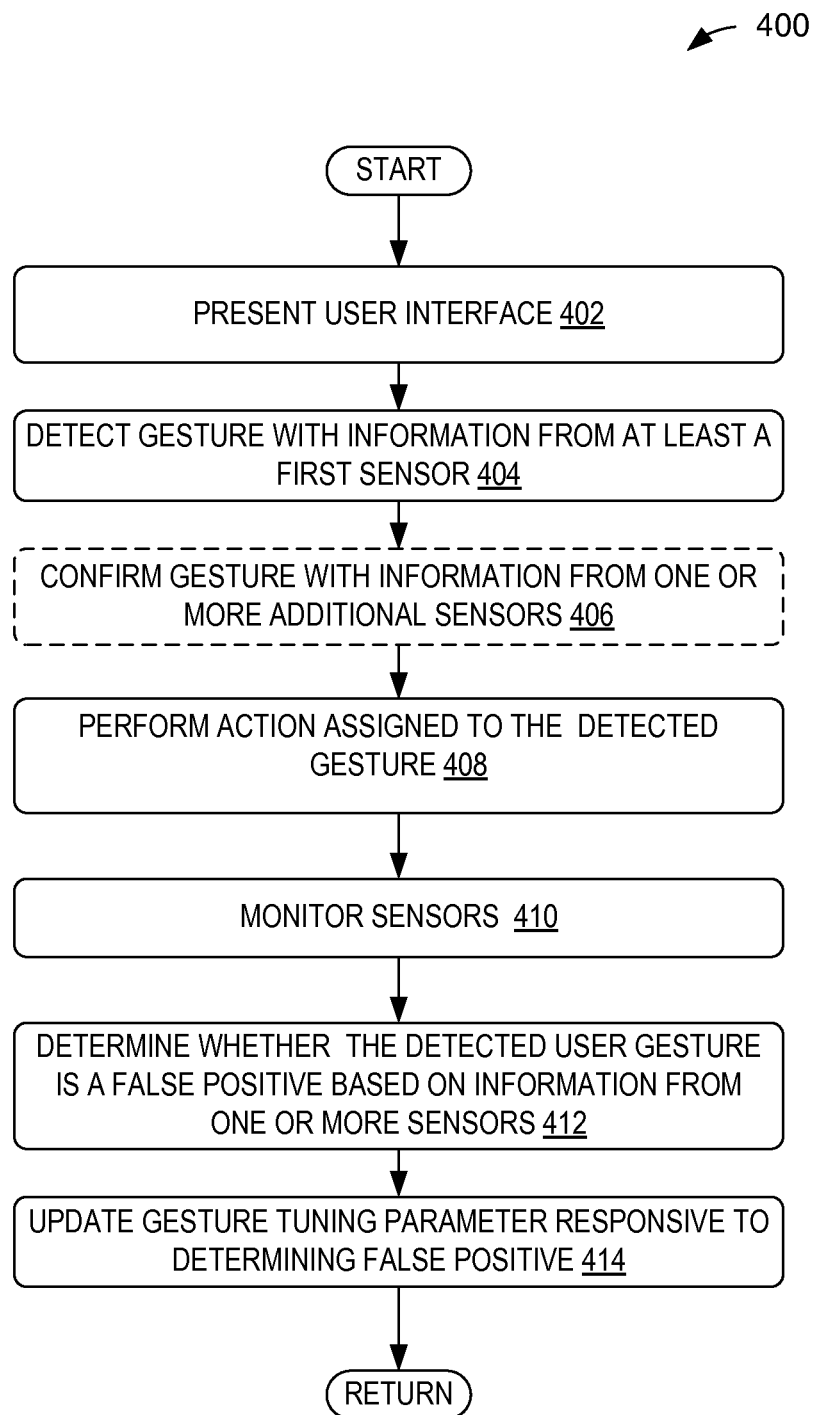
FIG. 4 is a flow chart illustrating a method for updating a gesture parameter in accordance with an embodiment of the present disclosure.

FIG. 4 shows a flow diagram depicting an embodiment of a method 400 for updating gesture parameters in a gesture recognition system in response to a false positive gesture recognition. Method 400 may be performed via the execution of instructions stored on a head-mounted device, and/or in any other suitable manner. At 402, method 400 includes presenting a user interface, for example, via a display of the user interface on a head-mounted display device. At 404, method 400 includes detecting a gesture based upon information from at least a first sensor. For example, a gesture may be detected based upon information from a gyroscope, accelerometer, camera, and/or other sensors identifying a change in position and/or orientation of a head of a wearer of the head-mounted display device. The detected gesture may include a hand gesture, arm gesture head gesture, eye gesture, body gesture, voice gesture (e.g., voice command/input), combinations thereof, and/or any other suitable gesture.

In some instances, data from two or more sensors may be used as a gesture input, as indicated at 406. For example, an eye tracking sensor may be utilized to determine a location on the user interface at which the user is gazing. Further a microphone may be utilized to determine if voice input from the wearer provides any contextual information relevant to the gesture. For example, a selection gesture may comprise a head gesture input (e.g., an upward nod) and a voice input (e.g., the voice command "SELECT"), each of which may be used interchangeably. If the voice command is detected with the performance of the head gesture, the voice command may serve as a confirmation and/or verification of the head gesture (or vice versa).

At 408, method 400 includes performing an action assigned to the detected gesture in response to detecting the gesture. For example, if the detected user gesture is a selection gesture, the action may include selecting a user interface component targeted by the selection gesture as determined, for example, via gaze tracking. The wearer thus receives visual feedback from the user interface regarding how the system interpreted wearer's motion.

Method 400 further includes, at 410, monitoring the one or more sensors, and at 412, determining whether the detected user gesture is a false positive based on information from the one or more sensors. For example, an undo gesture may be detected from sensor data, indicating that the wearer did not intend to perform a gesture associated with the action. In other instances, intent may be inferred from a context in which the detected user motion occurred, as described above with respect to the game illustrated in FIG. 1.

If the gesture is not determined to be a false positive, then method 400 returns without adjusting the gesture parameters. On the other hand, if the gesture is determined to be a false positive, then at 414, method 400 includes updating a gesture tuning parameter in such a manner as to reduce a likelihood that the motion will be interpreted as a false positive in the future.

Figure 5:
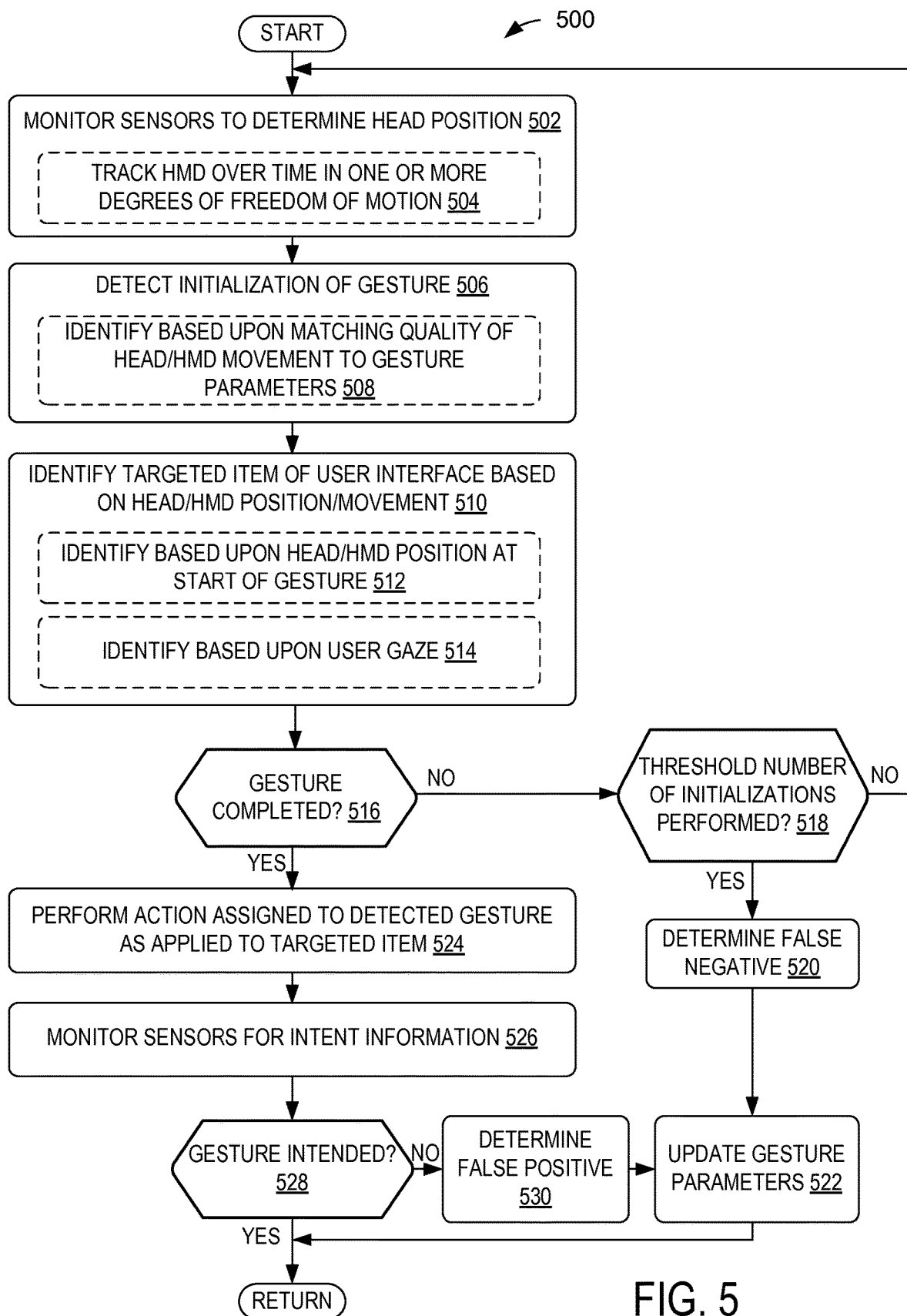
FIG. 5 is a flow chart illustrating another method for updating a gesture parameter in accordance with an embodiment of the present disclosure.

FIG. 5 shows a flow diagram depicting an embodiment of a method 500 for updating gesture parameters in a gesture recognition system. Method 500 may be performed via the execution of instructions stored on a head-mounted device, and/or in any other suitable manner. At 502, method 500 includes monitoring sensors of the head-mounted display device to determine a head position of a wearer. This may include, for example, tracking motion of the head-mounted display device over time in one or more degrees of freedom of motion (e.g. in six degrees of freedom in some embodiments), as indicated at 504. At 506, method 500 includes detecting an initialization of a gesture (e.g., by detecting performance of a first portion of a gesture). The gesture initialization may be identified based upon comparing motion sensor outputs to gesture parameters, as indicated at 508. The initialization of the user gesture may be unique to a particular gesture, or may be common to multiple gestures. In the latter example, the initialization of the user gesture may provide an indication that the user intended to make a gesture, but the particular gesture may not be determined.

At 510, method 500 further includes identifying one or more targeted items of a user interface. The targeted items may be identified based upon the HMD position at the start of the gesture, as indicated at 512, based upon a gaze of the user, as indicated at 514, or in any other suitable manner.

At 516, method 500 includes determining if the gesture is completed. For example, the gesture may be determined not to be completed if a head/HMD position over time is outside of the range of head/HMD motion associated with the gesture definition in one or more dimensions. If the gesture is not completed (e.g., "NO" at 516), the method 500 proceeds to 518 to determine whether a threshold number of initializations have been performed without completing the gesture. In some embodiments, various constraints may be applied to this determination, such as counting consecutive initializations without intervening gestures and/or counting initializations occurring within a time window. In other embodiments, the determination may not have such constraints.

If the number of initializations performed is not greater than the threshold (e.g., "NO" at 518), the method 500 returns to 502 to continue monitoring sensors. On the other hand, if the number of initializations performed is greater than the threshold (e.g., "YES" at 518), the method 500 determines at 520 that a false negative gesture detection has occurred, and updates gesture parameters accordingly at 522 to help reduce the likelihood of a false negative when the motion is performed in the future. In other instances, for example, where an initial portion of a gesture is common to several gestures, the gesture parameters may be updated after the gesture is performed correctly.

Returning to 516, if a gesture is determined to be completed (e.g. the motion as a whole is within the parameters of a gesture input), then method 500 comprises, at 524, performing a corresponding action assigned to the targeted user interface items. Upon performance of the action, method 500 may then comprise, at 526, monitoring the sensors for information regarding user intent (e.g. to detect false positives), and at 528, determining if the gesture was intended, as described above with regard to FIG. 4. If the gesture was not intended, then method 500 comprises, at 534, determining that a false positive condition has occurred, and at 522, updating gesture parameters. Method 500 returns to 502 to continue monitoring sensors to detect gestures.

In some embodiments, gestural data, adjusted gesture parameters, false positives/negatives, and other sensor information may be transmitted over a network to an external service and stored and/or forwarded to other gesture recognition systems with approval from a user of the device. In this way, a pool of gesture training data may be enlarged and consistently updated. This may assist with future parameter development. While the embodiments described above may be performed with a dedicated gesture training experience (e.g., the game described with respect to FIG. 1), the gesture training may occur organically during use of the device with other applications. It is to be understood that examples described above with respect to detecting head gestures may be applied to gesture parameters associated with eye tracking, voice recognition, hand tracking, and/or any other suitable input tuning. The tuning systems and method described herein may additionally or alternatively be applied to tuning output of a system (e.g., detecting that a user is hearing impaired and biasing audio accordingly) and providing an authoring system for users to author unique gestures and associated gesture parameters.

Figure 6:
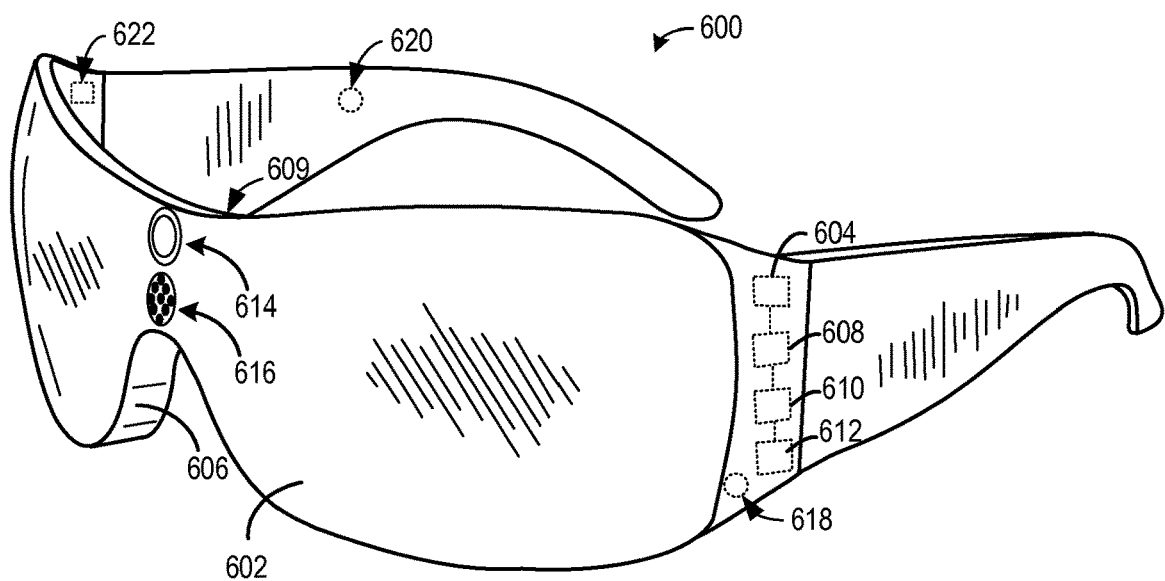
FIG. 6 shows an example head-mounted display device in accordance with an embodiment of the present disclosure.

FIG. 6 illustrates an example HMD device 600 in the form of a pair of wearable glasses with a transparent display 602. It will be appreciated that in other examples, the HMD device 600 may take other suitable forms in which a transparent, semi-transparent, non-transparent, and/or variably transparent display is supported in front of a viewer's eye or eyes. It will also be appreciated that the HMD device 110 shown in FIG. 1 may take the form of the HMD device 600, as described in more detail below, or any other suitable HMD device.

The HMD device 600 includes an image generation system, indicated schematically at 604, and transparent display 602 that enables images such as holographic objects to be delivered to the eyes of a wearer of the HMD. The transparent display 602 may be configured to visually augment an appearance of a physical environment to a wearer viewing the physical environment through the transparent display. For example, the appearance of the physical environment may be augmented by graphical content (e.g., one or more pixels each having a respective color and brightness) that is presented via the transparent display 602 to create a mixed reality environment.

The transparent display 602 may also be configured to enable a user to view a physical, real-world object in the physical environment through one or more partially transparent pixels that are displaying a virtual object representation. As shown in FIG. 6, in one example the transparent display 602 may include image-producing elements located within lenses 606 (such as, for example, a see-through Organic Light-Emitting Diode (OLED) display). As another example, the transparent display 602 may include a light modulator on an edge of the lenses 606. In this example the lenses 606 may serve as a light guide for delivering light from the light modulator to the eyes of a user. Such a light guide may enable a user to perceive a 3D holographic image located within the physical environment that the user is viewing, while also allowing the user to view physical objects in the physical environment, thus creating a mixed reality environment.

The HMD device 600 may also include various sensors and related systems. For example, the HMD device 600 may include a gaze tracking system 608 that includes one or more image sensors configured to acquire image data in the form of gaze tracking data from a user's eyes. Provided the user has consented to the acquisition and use of this information, the gaze tracking system 608 may use this information to track a position and/or movement of the user's eyes.

In one example, the gaze tracking system 608 includes a gaze detection subsystem configured to detect a direction of gaze of each eye of a user. The gaze detection subsystem may be configured to determine gaze directions of each of a user's eyes in any suitable manner. For example, the gaze detection subsystem may comprise one or more light sources, such as infrared light sources, configured to cause a glint of light to reflect from the cornea of each eye of a user. One or more image sensors may then be configured to capture an image of the user's eyes.

Images of the glints and of the pupils as determined from image data gathered from the image sensors may be used to determine an optical axis of each eye. Using this information, the gaze tracking system 608 may then determine a direction the user is gazing. The gaze tracking system 608 may additionally or alternatively determine at what physical or virtual object the user is gazing. Such gaze tracking data may then be provided to the HMD device 600.

It will also be understood that the gaze tracking system 608 may have any suitable number and arrangement of light sources and image sensors. For example and with reference to FIG. 6, the gaze tracking system 608 of the HMD device 600 may utilize at least one inward facing sensor 609.

The HMD device 600 may also include sensor systems that receive physical environment data from the physical environment. For example, the HMD device 600 may also include a head tracking system 610 that utilizes one or more motion sensors, such as motion sensors 612 on HMD device 600, to capture head pose data and thereby enable position tracking, direction and orientation sensing, and/or motion detection of the user's head. Accordingly and as described in more detail above, the gesture detection module 302 of FIG. 3 may receive head pose data as sensor information that enables the pose of the HMD device 600 to be estimated.

In one example, head tracking system 610 may comprise an inertial measurement unit configured as a three-axis or three-degree of freedom position sensor system. This example position sensor system may, for example, include three gyroscopes to indicate or measure a change in orientation of the HMD device 600 within 3D space about three orthogonal axes (e.g., x, y, z) (e.g., roll, pitch, yaw). In another example, head tracking system 610 may comprise an inertial measurement unit configured as a six-degree of freedom position sensor system. This example position sensor system may, for example, include three accelerometers and three gyroscopes to indicate or measure a change in location of the HMD device 600 along the three orthogonal axes and a change in device orientation about the three orthogonal axes.

Head tracking system 610 may also support other suitable positioning techniques, such as GPS or other global navigation systems. Further, while specific examples of position sensor systems have been described, it will be appreciated that any other suitable position sensor systems may be used. For example, head pose and/or movement data may be determined based on sensor information from any combination of sensors mounted on the wearer and/or external to the wearer including but not limited to any number of gyroscopes, accelerometers, inertial measurement units (IMUs), GPS devices, barometers, magnetometers, cameras (e.g., visible light cameras, infrared light cameras, time-of-flight depth cameras, structured light depth cameras, etc.), communication devices (e.g., WIFI antennas/interfaces), etc.

In some examples the HMD device 600 may also include an optical sensor system that utilizes one or more outward facing sensors, such as optical sensor 614 on HMD device 600, to capture image data. The outward facing sensor(s) may detect movements within its field of view, such as gesture-based inputs or other movements performed by a user or by a person or physical object within the field of view. The outward facing sensor(s) may also capture 2D image information and depth information from the physical environment and physical objects within the environment. For example, the outward facing sensor(s) may include a depth camera, a visible light camera, an infrared light camera, and/or a position tracking camera.

The optical sensor system may include a depth tracking system that generates depth tracking data via one or more depth cameras. In one example, each depth camera may include left and right cameras of a stereoscopic vision system. Time-resolved images from one or more of these depth cameras may be registered to each other and/or to images from another optical sensor such as a visible spectrum camera, and may be combined to yield depth-resolved video.

In other examples a structured light depth camera may be configured to project a structured infrared illumination, and to image the illumination reflected from a scene onto which the illumination is projected. A depth map of the scene may be constructed based on spacings between adjacent features in the various regions of an imaged scene. In still other examples, a depth camera may take the form of a time-of-flight depth camera configured to project a pulsed infrared illumination onto a scene and detect the illumination reflected from the scene. For example, illumination may be provided by an infrared light source 516. It will be appreciated that any other suitable depth camera may be used within the scope of the present disclosure.

The outward facing sensor(s) may capture images of the physical environment in which a user is situated. With respect to the HMD device 600, in one example a mixed reality display program may include a 3D modeling system that uses such captured images to generate a virtual environment that models the physical environment surrounding the user.

The HMD device 600 may also include a microphone system that includes one or more microphones, such as microphone 618 on HMD device 600, that capture audio data. In other examples, audio may be presented to the user via one or more speakers, such as speaker 620 on the HMD device 600.

The HMD device 600 may also include a controller, such as controller 622 on the HMD device 600. The controller may include a logic machine and a storage machine, as discussed in more detail below with respect to FIG. 7, that are in communication with the various sensors and systems of the HMD device and display. In one example, the storage subsystem may include instructions that are executable by the logic subsystem to receive signal inputs from the sensors, determine a pose of the HMD device 600, and adjust display properties for content displayed on the transparent display 602.

The present disclosure provides a visual tracking system that models detected motion of a device using motion-family models based on sensor information in order to determine an estimated pose of the device. Utilizing models that are selected based on detected pose/movement information associated with a wearer of the device mitigates the tradeoffs between stability and accuracy provided by the different motion-family models by selecting the model that is appropriate for the way in which the device is being used (e.g., whether the wearer is reading while sitting still, playing a game while moving, etc.).

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
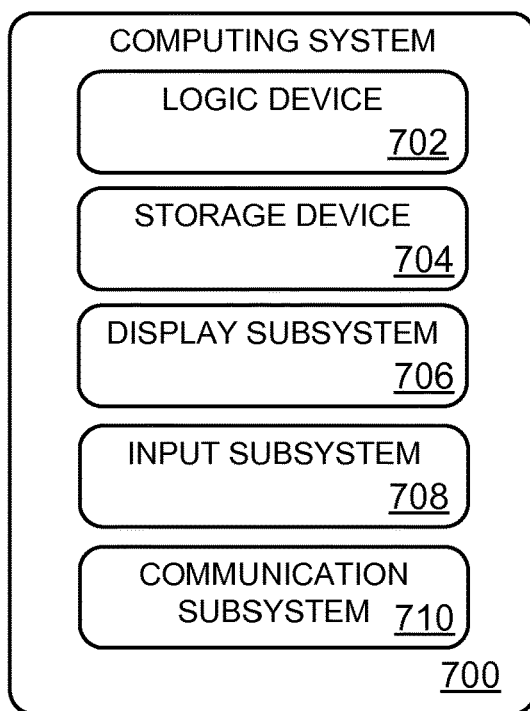
FIG. 7 shows an example computing system in accordance with an embodiment of the present disclosure.

FIG. 7 schematically shows a non-limiting embodiment of a computing system 700 that can enact one or more of the methods and processes described above. Computing system 700 is shown in simplified form. Computing system 700 may take the form of one or more head-mounted display devices, or one or more devices cooperating with a head-mounted display device (e.g., personal computers, server computers, tablet computers, home-entertainment computers, network computing devices, gaming devices, mobile computing devices, mobile communication devices (e.g., smart phone), and/or other computing devices).

Computing system 700 includes a logic machine 702 and a storage machine 704. Computing system 700 may optionally include a display subsystem 706, input subsystem 708, communication subsystem 710, and/or other components not shown in FIG. 7.

Logic machine 702 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic devices configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 704 includes one or more physical devices configured to hold machine-readable instructions executable by the logic machine to implement the methods and processes described herein. When such methods and processes are implemented, the state of storage machine 704 may be transformed—e.g., to hold different data.

Storage machine 704 may include removable and/or built-in devices. Storage machine 704 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 704 may include volatile, nonvolatile, dynamic, static, read/write, read-only, random-access, sequential-access, location-addressable, file-addressable, and/or content-addressable devices.

It will be appreciated that storage machine 704 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 702 and storage machine 704 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module" and "program" may be used to describe an aspect of computing system 700 implemented to perform a particular function. In some cases, a module or program may be instantiated via logic machine 702 executing instructions held by storage machine 704. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module" and "program" may encompass individual or groups of executable files, data files, libraries, drivers, scripts, database records, etc.

When included, display subsystem 706 may be used to present a visual representation of data held by storage machine 704. This visual representation may take the form of a graphical user interface (GUI). As the herein described methods and processes change the data held by the storage machine, and thus transform the state of the storage machine, the state of display subsystem 706 may likewise be transformed to visually represent changes in the underlying data. Display subsystem 706 may include one or more display devices utilizing virtually any type of technology, such as displays 602 of the HMD 600 illustrated in FIG. 6. Such display devices may be combined with logic machine 702 and/or storage machine 704 in a shared enclosure, or such display devices may be peripheral display devices.

When included, input subsystem 708 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; electric-field sensing componentry for assessing brain activity; any of the sensors described above with respect to head tracking system 610 of FIG. 6; and/or any other suitable sensor.

When included, communication subsystem 710 may be configured to communicatively couple computing system 700 with one or more other computing devices. Communication subsystem 710 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 700 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A head-mounted display device, comprising:
   a plurality of sensors;
   a display;
   a logic machine; and
   a storage machine holding instructions executable by the logic machine to
      receive information from one or more sensors of the plurality of sensors;
      determine from the information that a user is performing an initial portion of a gesture;
      determine that the gesture has not been completed;
      determine that the user has repeated the initial portion of the gesture for a threshold number of times without the gesture being completed;
      in response to determining that the user has repeated the initial portion of the gesture for the threshold number of times without the gesture being completed, update a first definition of the gesture based on the initial portion of the gesture, including updating a range of parameter values for at least one detectable parameter, the update resulting in a second definition of the gesture;
      receive information from one or more sensors of the plurality of sensors, the information comprising a later detected motion not meeting the first definition of the gesture and meeting the second definition of the gesture; and
      perform an action on the head-mounted display device in response to the later detected motion.

2. The head-mounted display device of claim 1, wherein the plurality of sensors comprises two or more of an accelerometer, a gyroscope, a microphone, and a camera.

3. The head-mounted display device of claim 1, wherein the instructions are further executable by the logic machine to detect a motion characteristic of a head movement, and wherein updating the range of parameter values for the at least one detectable parameter further comprises adjusting a range of head movements based on the motion characteristic of the head movement detected.

4. The head-mounted display device of claim 1, wherein the instructions are further executable by the logic machine to determine a user intent, and wherein determining the user intent comprises determining an intent to perform a gesture input from a state of a user interface.

5. The head-mounted display device of claim 4, wherein the user interface comprises a game user interface.

6. The head-mounted display device of claim 4, wherein determining the user intent comprises determining whether a location of the action on the user interface corresponds to a location at which the action produces a target user interface state.

7. The head-mounted display device of claim 1, wherein the instructions are further executable by the logic machine to determine a user intent, and wherein determining the user intent comprises determining an intent to perform the intended gesture from sensor data received after performing the action.

8. The head-mounted display device of claim 7, wherein determining the user intent comprises detecting one or more of a hand gesture via data acquired by a camera, a voice input via data acquired by a microphone, and an undo command configured to undo the action.

9. The head-mounted display device of claim 1, wherein the instructions are further executable by the logic machine to determine a user intent, and wherein determining the user intent comprises identifying the gesture based upon a head movement and a gaze location as determined from sensor data.

10. On a head-mounted display device, a method of adapting a gesture recognition system configured to recognize three-dimensional gestures, the method comprising:
   monitoring two or more sensors of the head-mounted display device to track motion of the head-mounted display device over time;
   detecting a motion of the head-mounted display device;
   in response to detecting the motion of the head-mounted display device,
      determining that a user is performing an initial portion of a gesture;
      determining that the gesture has not been completed;
      determining that the user has repeated the initial portion of the gesture for a threshold number of times without the gesture being completed;
      in response to determining that the user has repeated the initial portion of the gesture for the threshold number of times without the gesture being completed, updating a first definition of the gesture based on the initial portion of the gesture, including updating a range of parameters, the update resulting in a second definition of the gesture;
   detecting a later motion of the head-mounted display device that does not meet the first definition of the gesture and that meets the second definition of the gesture; and
   in response to detecting the later motion of the head-mounted display device, performing an action on the head-mounted display device.

11. The method of claim 10, wherein the range of parameters specifies a range of head movements in one or more dimensions, and wherein updating the range of parameters comprises changing the range of head movements in at least one of the one or more dimensions.

12. The method of claim 10, further comprising detecting a false negative gesture recognition, and updating the range of parameters in response to detecting the false negative gesture recognition.

13. The method of claim 12, wherein the range of parameters specifies a range of head movements in one or more dimensions, and wherein updating the range of parameters comprises expanding the range of head movements.

14. A head-mounted display device comprising:
   a display;
   a logic machine; and
   a storage device comprising instructions executable by the logic machine to
      present a user interface of a game on the display, the user interface including one or more interactive game elements and each of the interactive game elements having a changeable visual state;
      receive information from one or more sensors;

determine from the information that a user is performing an initial portion of a gesture;

determine that the gesture has not been completed;

determine that the user has repeated the initial portion of the gesture for a threshold number of times without the gesture being completed;

in response to determining that the user has repeated the initial portion of the gesture for the threshold number of times without the gesture being completed, update a first definition of the gesture based on the initial portion of the gesture, including updating a range of parameter values for at least one detectable parameter, the update resulting in a second definition of the gesture;

receive information from the one or more sensors comprising a later detected motion, the later detected motion not meeting the first definition of the gesture and meeting the second definition of the gesture; and change a visual state of a selected interactive game element in response to the later detected motion.

15. The head-mounted display device of claim 14, wherein the instructions are further executable to identify that a target of the gesture is the selected interactive game element based upon information from a gaze tracking sensor.

16. The head-mounted display device of claim 15, wherein the instructions are further executable to identify the gesture based upon information from one or more sensors tracking a head position over time.

17. The head-mounted display device of claim 14, wherein the instructions are further executable to detect a false positive gesture recognition by determining that a selected interactive element already has a target visual state.

18. The head-mounted display device of claim 17, wherein the instructions are executable to update the range of parameter values for the at least one detectable parameter by decreasing a range of movements within the definition of the gesture.

19. The head-mounted display device of claim 14, wherein the instructions are further executable to detect that the gesture is directed to a selected interactive element by detecting a gaze direction.

20. The method of claim 12, wherein detecting the false negative gesture recognition comprises determining that the user has repeated the first portion of the gesture while targeting a same interactive element.

* * * * *